(12) United States Patent
Shimaya et al.

(10) Patent No.: US 7,546,725 B2
(45) Date of Patent: Jun. 16, 2009

(54) SILENT CHAIN

(75) Inventors: Kazuhiko Shimaya, Osaka (JP); Kenichi Nagao, Osaka (JP); Toshitaka Ogo, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 466 days.

(21) Appl. No.: 11/446,440

(22) Filed: Jun. 2, 2006

(65) Prior Publication Data

US 2007/0032325 A1   Feb. 8, 2007

(30) Foreign Application Priority Data

Aug. 5, 2005   (JP)   ............... 2005-228568

(51) Int. Cl.
*B21L 9/04* (2006.01)
*F16G 13/04* (2006.01)

(52) U.S. Cl. ............. 59/35.1; 59/5; 59/8; 59/78; 72/53; 29/90.7; 474/206; 474/229

(58) Field of Classification Search ............... 59/4, 59/5, 35.1, 78, 8; 474/206, 229; 72/53; 29/90.7
See application file for complete search history.

(56) References Cited

U.S. PATENT DOCUMENTS

| 3,706,199 | A  | * | 12/1972 | Zimmer | ............... | 59/8 |
| 6,220,981 | B1 |   | 4/2001  | Yoshida |  |  |
| 6,881,500 | B2 | * | 4/2005  | Sugiyama | ............ | 428/687 |
| 7,441,396 | B2 | * | 10/2008 | Fuse | ............... | 59/7 |

FOREIGN PATENT DOCUMENTS

| JP | 58-14538   | 1/1983  |
| JP | 09-217796  | 8/1997  |
| JP | 10-311381  | 11/1998 |
| JP | 11-090829  | 4/1999  |
| JP | 11-236949  | 8/1999  |
| JP | 2003-260536 | 9/2003 |
| JP | 2003-322222 | 11/2003 |

* cited by examiner

*Primary Examiner*—David B Jones
(74) *Attorney, Agent, or Firm*—Howson & Howson LLP

(57) ABSTRACT

Link plates of a silent chain are produced by first shaving the inner surfaces of the connecting pin holes, the sprocket tooth-engaging surfaces, and the backs of the link plates, and then forming dimples on those surfaces by shot-peening.

8 Claims, 3 Drawing Sheets

SILENT CHAIN

CROSS-REFERENCE TO RELATED APPLICATION

This application claims priority on the basis of Japanese patent application 2005-228568, filed Aug. 5, 2005. The disclosure of Japanese application 2005-228568 is hereby incorporated by reference.

FIELD OF THE INVENTION

The invention relates to a silent chain of the type typically used as a timing chain in an internal combustion engine. The invention relates more particularly to a silent chain having wear-resistant properties making it especially useful as a timing chain in a direct injection engine, in which a fuel, for example diesel fuel, is directly injected the engine cylinders and ignited by the high temperature resulting from compression of air in the cylinders.

BACKGROUND OF THE INVENTION

Japanese Laid-Open Patent Publication No. 2003-260536 describes a silent chain composed of interleaved, toothed, link plates and connecting pins, in which sprocket tooth-engaging surfaces of inner flanks and outer flanks of the link plate teeth are formed by shaving to reduce wear of sprocket teeth surfaces and to prevent flexion failure.

The surfaces of the link plates are remarkably improved by shaving. However, in a direct injection engine, combustion residues such as carbon and similarly abrasive substances, generally referred to as "soot," are generated by incomplete combustion of fuel such as diesel fuel. When the shave surfaces of the chain are exposed to this soot, especially when the soot, along with engine lubricating oil, enters the connecting pin holes in the link plates, the soot promotes wear between the inner surfaces of the pin holes and the outer surfaces of the pins. The wear of the pin holes, and of the pins, results in "wear elongation" of the chain over time. Wear elongation, in turn, impairs engine performance, and brings about the need for early timing chain replacement.

The soot in a direct injection engine can also adhere to sprocket tooth-engaging surfaces of the link plates and to the backs of the link plates, causing wear of the sprocket teeth, and link plate teeth as well as wear of chain guide shoes and tensioner lever shoes on which the backs of the link plates slide. Excessive wear of these components significantly shortens their useful life.

This invention addresses the above-mentioned problems. In particular, objects of the invention include one or more of the following objects: reduction of pin hole wear, reduction of wear elongation; reduction in sprocket tooth wear, reduction in link plate tooth wear, reduction of guide shoe and tensioner shoe wear, and improvement of link plate fatigue resistance. The advantages of the invention are especially significant in the case in which the chain is utilized as a timing chain in a direct injection internal combustion engine.

SUMMARY OF THE INVENTION

In accordance with the invention, a silent chain is made by a process in which the inner surfaces of the pin-receiving holes in the link plates are subjected to shot peening, which forms dimples on the inner surfaces. The link plates are arranged in interleaved rows, and the interleaved rows are interconnected by insertion of connecting pins though the dimpled pin-receiving holes.

Preferably, dimples are also formed, by shot peening, on the sprocket tooth-engaging surfaces of the link plates, on the back surfaces of the link plates, or both on the sprocket tooth-engaging surfaces and the back surfaces. In preferred embodiments, the shot peening steps are preceded by shaving steps.

The term "shot-peening," as used herein, refers to the projecting of shot materials, such as stainless steel balls or the like, against a surface of a workpiece, thereby producing a matte-finish rough surface, characterized by numerous fine dimples. The shot-peening process applies residual compression stress, thereby hardening the surface of the workpiece.

The term "shaving," as used herein, refers to the use of a bar-shaped or column-shaped tool, having a contour that slightly overlaps the contour of a workpiece blank, to remove a thin portion of a surface of the workpiece blank. The contour of the shaving tool can be similar to the contour of a punch used to form the blank, but the dimensions of the shaving tool differ from those of the punch by an amount corresponding to the amount of material to be removed in the shaving process. The shaving step removes roughness and shear drops generated during punching, and improve the surface accuracy of the punched blank.

A silent chain made in accordance with the invention can transmit power in the timing drive of an engine, for example, without producing large amounts of noise. When the silent chain is used as a timing chain in a direct injection engine, soot entering the pin holes of the link plates together with engine oil is retained within the dimples formed on the inner surfaces of the pin holes. As a result, the abrasive action of the soot is reduced, wear of the inner surfaces of the pin holes is suppressed, and chain wear elongation is reduced. In addition, the inner surfaces of the pin holes are hardened as a result of residual compression stress, and therefore the fatigue strength of the timing chain is improved.

If dimples are formed by shot-peening on the sprocket tooth-engaging surfaces of the link plates, retention of oil within those dimples similarly reduces the abrasive action of soot on the sprocket tooth-engaging surfaces, and significantly reduces sprocket tooth wear, and also improves the fatigue strength of the sprocket tooth-engaging surfaces.

Similarly, if dimples are formed on the back surfaces of the link plates by shot-peening, oil retained within the dimples on the back surfaces of the link plates significantly reduces wear of the sliding contact surfaces of chain guides and tensioner levers engaged with the chain, and also improves the fatigue strength of the back surfaces of the link plates.

When the inner surfaces of the pin-receiving holes are subjected to a shaving step prior to shot-peening, the dimensional accuracy of the inner surfaces of the holes is improved, and a more uniform load distribution is achieved along the direction of pin insertion. Consequently, chain wear elongation due to uneven contact between the connecting pins and the inner surfaces of the pin-receiving holes is reduced. Shaving of the sprocket tooth-engaging surfaces and the back surfaces of the link plates prior to shot peening also produces beneficial effects, in that the improvement of surface accuracy resulting from the shaving step reduces uneven wear.

DETAILED DESCRIPTION OF THE PREFERRED EMBODIMENTS

Figure 1:
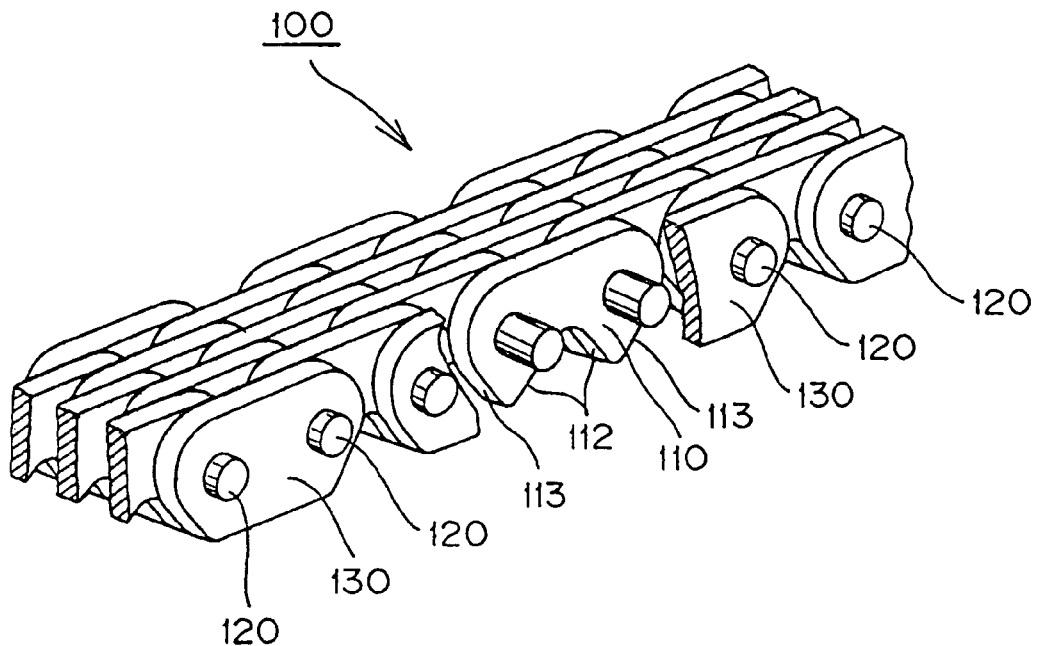
FIG. 1 is an oblique perspective view, partially broken away, of a portion of a silent chain produced in accordance with the invention.

As shown in FIG. 1, the silent chain 100, in accordance with the invention, is formed by arranging link plates 110 in rows extending widthwise with respect to the longitudinal direction of the chain, interleaving the rows, and connecting the rows by inserting connecting pins 120 through pin-receiving holes in the link plates. The pins fit through the pin-receiving holes in the link plates with a suitable clearance to allow articulation of the chain. However, the pins are fixed to guide plates 130 provided along both sides of the chain at opposite ends of every second link plate row.

Figure 2:
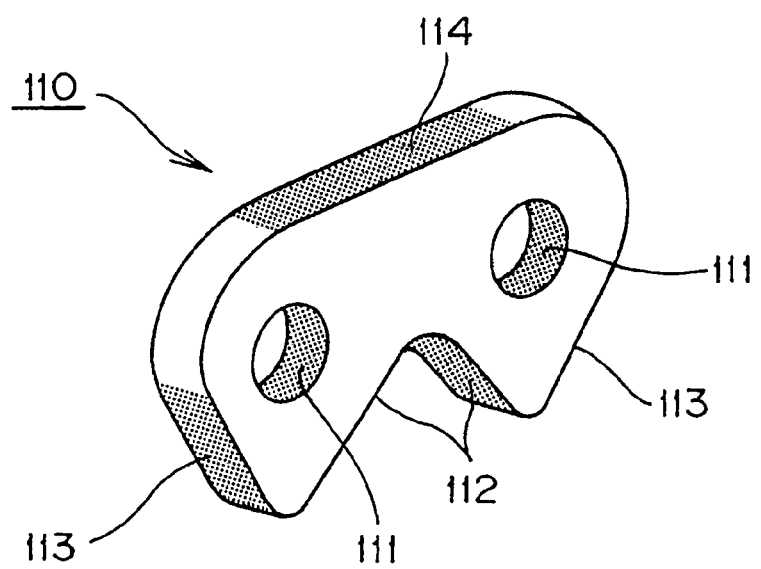
FIG. 2 is a perspective view of a link plate of the silent chain shown in FIG. 1.

Each link plate has a pair of teeth, and each tooth has an inner surface 112 and an outer surface 113. Depending on the transmission design, inner surfaces 112, outer surfaces 113, or both, can serve as sprocket tooth-engaging surfaces. The link plates also have back surfaces 114 (FIG. 2), which slide on a chain guide, a tensioner lever, or both, in a typical engine timing transmission.

The guide plates 130 engage the sides of the sprocket teeth of a power transmission, maintaining engagement of the chain with the sprockets, and ensuring stable and smooth motion of the chain as it comes into engagement with the sprockets.

In the production of a link plate in accordance with a preferred embodiment of the invention, the link plate is initially formed by punching a sheet of metal stock to form, from the metal stock, a blank having the general configuration of a link plate. That is, the blank has a pair of teeth, a back surface, and a pair of pin-receiving holes. The punched blank remains connected to the metal stock by narrow bridges at locations which do not contact a sprocket, a chain guide or other transmission parts, and therefore do not need to be finished to a smooth condition. The bridges maintain the punched blank in fixed relationship with the stock material. Bridges are shown, for example, in Japanese Laid-Open Patent Publication No. 2003-260536 and in U.S. Pat. No. 7,021,176, granted Apr. 4, 2006. The disclosure of U.S. Pat. No. 7,021,176 is incorporated by reference. Following the punching step, the link plate blank is subjected to a shaving step, in which the pin-receiving holes 111 are enlarged, and, optionally, one or more of the exterior surfaces of the link plate, that is, the tooth surfaces 112 and 113, and the back 114, are reduced. The bridges are removed, and the link plate is completely separated from the metal stock, in the shaving step.

The shaving step is preferably carried out by means of a bar-shaped or column-shaped shaving tool. In the shaving tool, the contours of the parts that shave the pin-receiving holes are slightly larger than the contours of the parts of the punch that form the pin-receiving holes. On the other hand, the contours of the parts of the shaving tool that form the tooth surfaces 112 and 113, and the back surface 114 are slightly smaller than the contours of the corresponding parts of the punch.

Preferably, at least 70% of the thickness of the link plate is shaved. The shaving step removes rough surfaces and shear drops generated in the process of punching the stock material. It also improves the accuracy of the clearance between the inner surfaces of the pin holes 111 and the connecting pins 120, so that a more uniform load distribution is achieved along the direction of pin insertion. As a result, unbalanced loads between the pin hole inner surfaces and the connecting pins 120 are avoided, and wear elongation of the chain, due to non-uniform contact between the pins and the pin-receiving holes is reduced. Furthermore, the shaving step also ensures a right angle relationship between the side faces of the link plate and its tooth surfaces 112 and 113, thereby ensuring area contact between the link plate teeth and the sprocket teeth. Shaving of the back surfaces 114 of the link plates ensures that the back surfaces are accurately planar, so that the back surfaces of the chain link plates slide smoothly on the shoe of a tensioner or a chain guide, and wear of the shoe surface is reduced.

Figure 3:
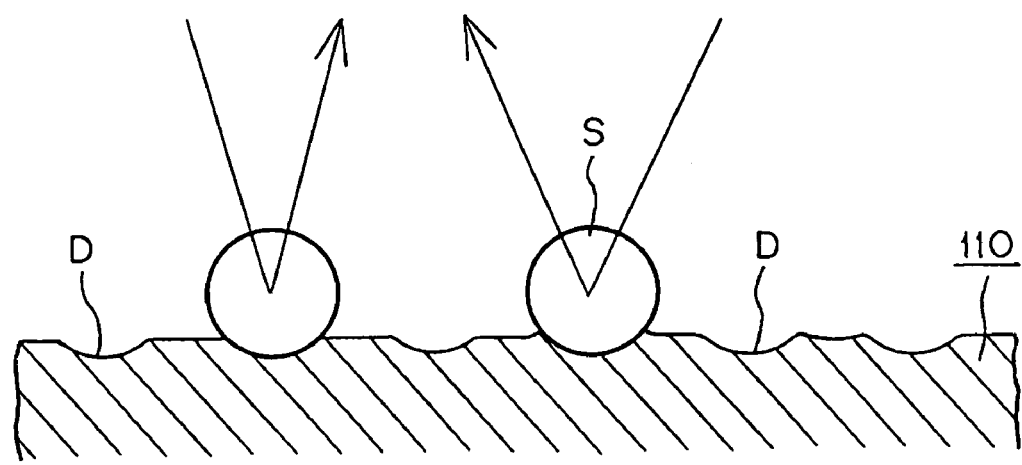
FIG. 3 is a schematic view illustrating the process of shot-peening a surface of a link plate.

As shown in FIG. 3, dimples D are formed on surfaces of the link plates. Dimples may be formed on the inner surfaces of the pin holes 111, the tooth surfaces 112 and 113, and the back surface 114, by shot-peening. The areas to which shot peening is applied are indicated by dotted shading in FIG. 2.

The dimples formed by shot peening are preferably sufficiently fine that they form matte-finish rough surfaces. The shot materials S, as shown in FIG. 3, can be any of various materials, but are preferably small stainless steel spheres. The shot materials S can be projected against the link plate surfaces from various directions, as indicated by the paths shown in FIG. 3. The shot peening process not only produces dimples, but also applies residual compression stress to various surfaces of the link plate, thereby hardening those surfaces.

The silent chain of the invention is particularly advantageous when used as a timing chain in a direct injection engine, where significant quantities of soot, consisting of combustion residues such as carbon and other abrasive substances, can enter the pin holes of the link plate along with engine oil. Because the soot, together with engine oil, is retained within the fine dimples D formed on the inner surfaces of the pin holes, the abrasive effect of the soot is significantly suppressed. Shot peening not only reduces wear, but, as mentioned previously, hardens the surfaces to which it is applied, and thereby improves the fatigue strength of the chain.

Figure 4:
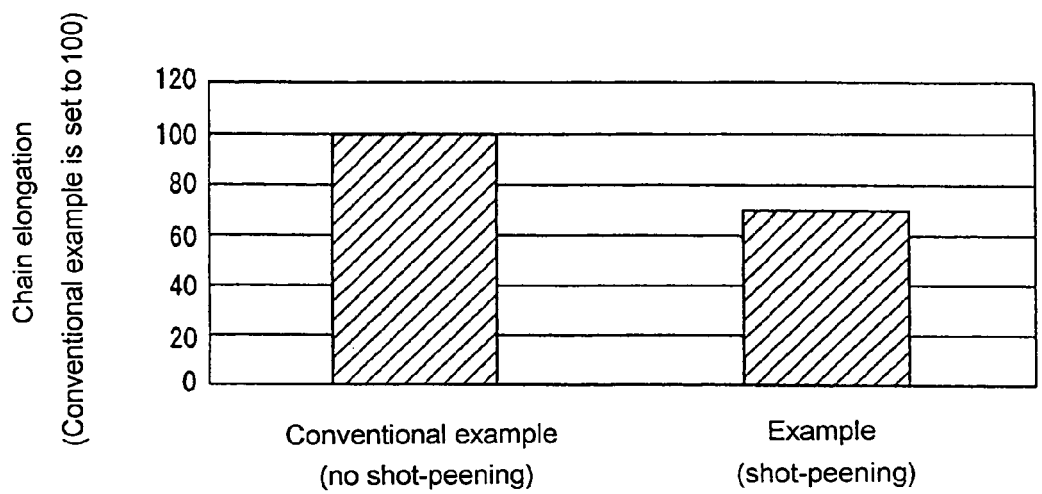
FIG. 4 is a bar graph showing the relationship between shot-peening and chain elongation.

As compared with a conventional silent chain without shot-peening, the wear of the inner surfaces of the pin holes 111 is suppressed sufficiently to reduce wear elongation of the chain by about 30% as shown in FIG. 4.

Figure 5:
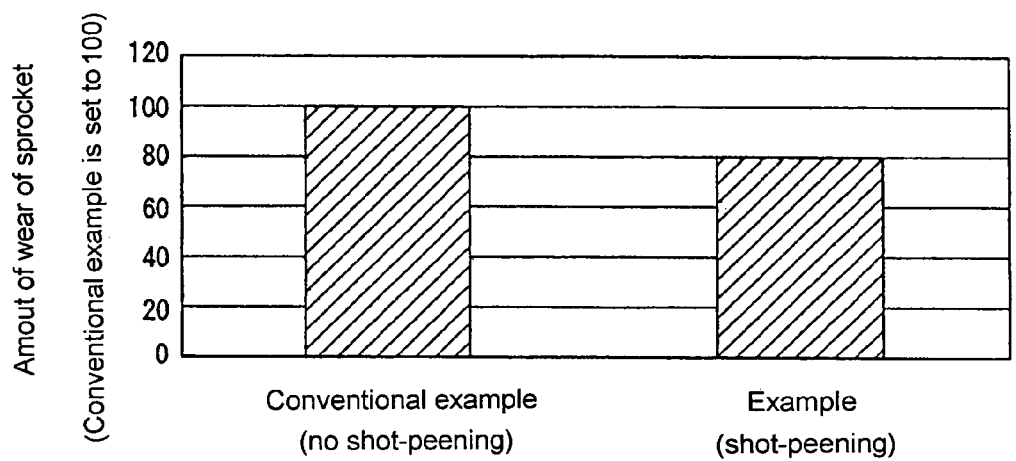
FIG. 5 is a bar graph showing the relationship between shot-peening and sprocket wear.

As compared with a conventional silent chain without shot-peening, when the sprocket tooth-engaging surfaces of the chain teeth are shot peened, wear of the sprocket teeth can be suppressed by about 20%, as shown in FIG. 5.

Figure 6:
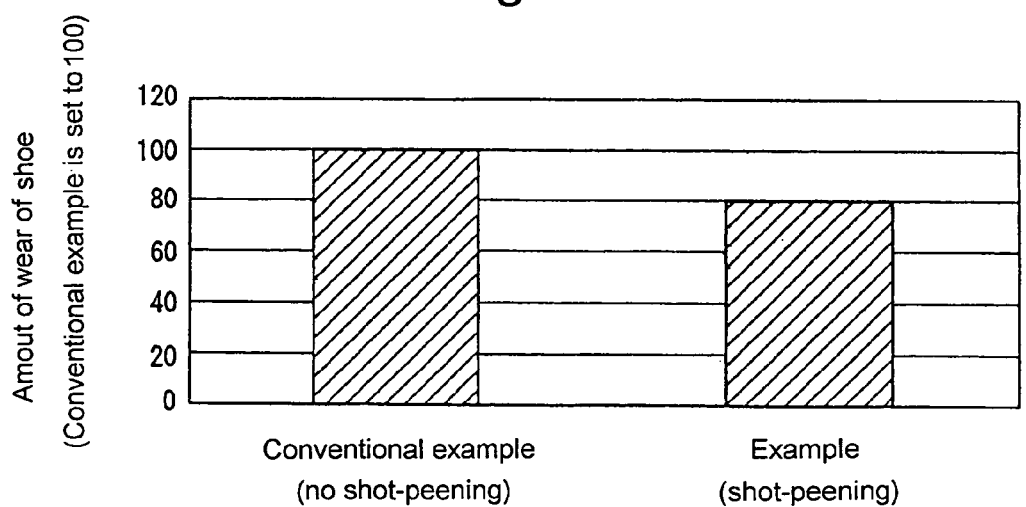
FIG. 6 is a bar graph showing the relationship between shot-peening and wear in the shoe of a chain guide.

When the back surfaces 114 of the link plates are shot-peened, soot, along with engine oil, is retained within the fine dimples formed on the back surfaces, and the abrasive action of the soot on guide shoes and tensioner shoes is reduced. As compared with a conventional silent chain without shot-peening, the wear of a chain guide in sliding contact with the back surface 114 of a link plate 110 can be suppressed by about 20%, as shown in FIG. 6.

Preferably, a hardened layer, composed of vanadium carbide, is formed on the cylindrical surfaces of the connecting pins 120. The hardened layer on the surfaces of the pins is chemically stable, and consequently, adhesion between the inner surfaces of the pinholes and the outer surfaces of the connecting pins can be avoided even when the oil film between the surfaces is so thin that it becomes broken, and portions of the surfaces come into direct contact with each other. Only a minute amount of wear of the outer surface of the connecting pin 120 is experienced. Accordingly, by utilizing a vanadium carbide layer, wear elongation of the chain can be even further reduced.

In summary, in a most preferred embodiment of the invention, the inner surfaces of the pin holes, the sprocket tooth-engaging surfaces, and the backs of the link plates are subjected to shaving, and then shot-peened to produce fine dimples. Wear produced in the pin-receiving holes of the link plates as a result of abrasion by soot, and as a result of non-uniform contact between the pin-receiving holes and the connecting pins along the lengths of the pins, is significantly reduced. Sprocket tooth wear and guide shoe wear is also significantly reduced as a result of the shaving and shot-peening processes. Finally, the fatigue strength of the chain is also improved as a result of shot peening.

Although the silent chain of the invention is particularly advantageous when used in a direct injection engine, where significant quantities of soot become mixed with engine lubricating oil, the silent chain can also be used advantageously in various other kinds of engines and machinery, especially where wear due to fine abrasive particles is a problem.

Where tooth surfaces of the link plate teeth are to be shot peened in accordance with the invention, only those surfaces that contact the sprocket teeth need to be shot peened. Thus, in the case of a silent chain in which only the inner surfaces 112 engage the sprocket teeth, only those surfaces need to be shot-peened. Similarly, only the outer surfaces 113 engage the sprocket teeth, only those surfaces need to be shot-peened. In a case in which both the inner and outer tooth surfaces engage sprocket teeth, both the inner and outer surfaces 112 and 113 should be shot-peened.

The fine dimples preferably form matte-finish, rough surfaces, and can be produced using stainless steel balls or similar shot. The dimples can take various forms, and need not be uniform. For example, the dimples can be in the form of large and small concavities having generally spherical surfaces. Moreover, the shot peening process can produce a surface in which the dimples overlap one another, so that the surface, in effect, consists of a pattern of projections and depressions, or a pattern of discrete projections.

As mentioned previously, it is preferable that a hardened layer composed of vanadium carbide be formed on the cylindrical outer surfaces of the connecting pins. Alternative hard carbide layers that can be formed on the pins include chromium carbide, titanium carbide, and niobium carbide. The hardened layer on the surface of the pin is chemically stable and suppresses adhesion between the connecting pins and the inner surfaces of the pin holes, thereby further reducing wear elongation.

We claim:

1. A method of making a silent chain comprising the steps of:
   providing link plates having sprocket tooth-engaging surfaces and pin-receiving holes, said pin-receiving holes having inner surfaces;
   providing connecting pins;
   subjecting said inner surfaces of said pin-receiving holes in said link plates to shot peening and thereby forming dimples on said inner surfaces; arranging said link plates in interleaved rows; and
   interconnecting said interleaved rows by inserting one of said connecting pins through each of the dimpled pin-receiving holes;
   in which the shot peening of the inner surface of each pin-receiving hole is preceded by shaving of said inner surface.

2. A method of making a silent chain comprising the steps of:
   providing link plates having sprocket tooth-engaging surfaces and pin-receiving holes, said pin-receiving holes having inner surfaces;
   providing connecting pins;
   subjecting said inner surfaces of said pin-receiving holes in said link plates to shot peening and thereby forming dimples on said inner surfaces; arranging said link plates in interleaved rows;
   interconnecting said interleaved rows by inserting one of said connecting pins through each of the dimpled pin-receiving holes; and
   forming dimples on said sprocket tooth-engaging surfaces;
   in which the formation of dimples on each said sprocket tooth-engaging surface by shot-peening is preceded by shaving of said sprocket tooth-engaging surface.

3. The method according to claim 2, in which said link plates have back surfaces, the method including the step of forming dimples on said back surfaces by shot peening.

4. A method of making a silent chain comprising the steps of:
   providing link plates having sprocket tooth-engaging surfaces, back surfaces, and pin-receiving holes, said pin-receiving holes having inner surfaces;
   providing connecting pins;
   subjecting said inner surfaces of said pin-receiving holes in said link plates to shot peening and thereby forming dimples on said inner surfaces;
   arranging said link plates in interleaved rows;
   interconnecting said interleaved rows by inserting one of said connecting pins through each of the dimpled pin-receiving holes; and
   forming dimples on the back surfaces of said link plates by shot peening;
   in which the formation of dimples on each said back surfaces by shot peening is preceded by shaving of said back surfaces.

5. A silent chain comprising rows of link plates having sprocket tooth-engaging surfaces and pin-receiving holes, and connecting pins extending through said pin-receiving holes in the link plates and connecting the link plates in interleaved relationship, in which each said pin-receiving hole has a dimpled inner surface formed by shot-peening, and in which each said dimpled inner surface of a pin-receiving hole is formed by subjecting a pin-receiving hole to shaving before shot-peening.

6. A silent chain comprising rows of link plates having sprocket tooth-engaging surfaces and pin-receiving holes, and connecting pins extending through said pin-receiving holes in the link plates and connecting the link plates in interleaved relationship, in which each said pin-receiving hole has a dimpled inner surface formed by shot-peening, in which each said sprocket tooth engaging surface is a dimpled surface formed by shot-peening, and in which each said dimpled sprocket-tooth engaging surface is formed by subjecting a sprocket tooth engaging surface to shaving before shot-peening.

7. A silent chain according to claim 6, in which each link plate has a dimpled back surface formed by shot-peening.

8. A silent chain comprising rows of link plates having sprocket tooth-engaging surfaces and pin-receiving holes, and connecting pins extending through said pin-receiving holes in the link plates and connecting the link plates in interleaved relationship, in which each said pin-receiving hole has a dimpled inner surface formed by shot-peening, in which each link plate has a dimpled back surface formed by shot peening, and in which each said dimpled back surface of a link plate is formed by subjecting a back surface of a link plate to shaving before shot-peening.

* * * * *